United States Patent
Martin et al.

(10) Patent No.: US 10,317,246 B2
(45) Date of Patent: Jun. 11, 2019

(54) MATERIAL TRACKING SYSTEM

(71) Applicant: Wire Pulse, Inc., Chicago, IL (US)

(72) Inventors: Eric M. Martin, Plainfield, IL (US); Andrew F. Human, Chicago, IL (US)

(73) Assignee: Wire Pulse, Inc., Chicago, IL (US)

( * ) Notice: Subject to any disclaimer, the term of this patent is extended or adjusted under 35 U.S.C. 154(b) by 712 days.

(21) Appl. No.: 14/810,236

(22) Filed: Jul. 27, 2015

(65) Prior Publication Data

US 2016/0023863 A1     Jan. 28, 2016

Related U.S. Application Data

(60) Provisional application No. 62/115,486, filed on Feb. 12, 2015, provisional application No. 62/029,934, filed on Jul. 28, 2014.

(51) Int. Cl.

| | |
|---|---|
| *G01D 5/12* | (2006.01) |
| *B65H 16/02* | (2006.01) |
| *B65H 63/08* | (2006.01) |
| *G01D 5/347* | (2006.01) |

(52) U.S. Cl.
CPC ............ *G01D 5/12* (2013.01); *B65H 16/025* (2013.01); *B65H 63/08* (2013.01); *G01D 5/3473* (2013.01); *B65H 2511/114* (2013.01)

(58) Field of Classification Search
CPC .......... G01D 5/12; G01D 5/26; G01D 5/3473; B65H 16/025; B65H 49/18; B65H 61/00; B65H 63/08; B65H 2511/114

USPC ....................................................... 242/563.2
See application file for complete search history.

(56) References Cited

U.S. PATENT DOCUMENTS

| | | | | |
|---|---|---|---|---|
| 4,447,955 A | * | 5/1984 | Stutz ...................... | B65H 61/00 242/487.5 |
| 5,988,556 A | * | 11/1999 | Bednarczyk ........... | B65H 54/34 242/476.2 |
| 6,588,696 B1 | * | 7/2003 | Riihela ................. | B65H 19/181 242/554.5 |
| 8,176,593 B2 | * | 5/2012 | Gress ..................... | B08B 9/045 15/104.33 |

* cited by examiner

*Primary Examiner* — Michael R Mansen
*Assistant Examiner* — Nathaniel L Adams
(74) *Attorney, Agent, or Firm* — Nyman IP LLC; Scott Nyman (57) ABSTRACT

A system and method for tracking the remaining length of a material wound on a reel is disclosed. In the system, two sensors deployed relative to the reel (and each other) produce a detection signals when a detection element mounted on the reel is near the respective sensor in an order indicative of forward or reverse reel rotation. The system further includes a processor operably receiving the detection signals to count a total number of forward rotations of the reel, which count is saved in memory. A battery powers the processor, memory, and sensors. The system further includes a transceiver that removably and operably couples between the memory and a calculator that calculates the remaining length of the material wound on the reel based on the total number of forward rotations of the reel. The system may also record the time and location associated with the rotations.

13 Claims, 7 Drawing Sheets

MATERIAL TRACKING SYSTEM

CROSS REFERENCE TO RELATED APPLICATIONS

This application claims priority to U.S. provisional patent application 62/029,934 filed on Jul. 28, 2014 and U.S. provisional patent application 62/115,486 filed on Feb. 12, 2015 the entire disclosure of which are incorporated by reference and for all purposes as if fully set forth herein.

BACKGROUND OF THE INVENTION

Field of the Invention

The invention relates system and methods for tracking a current amount of material contained on a reel.

Discussion of the Prior Art

Many materials used in construction or the fabrication of products (e.g., wire, cable, tubing, yarn, rope etc.) are sold from the manufacturer on reels. Distributing materials on reels allows users (e.g., installers, contractors, manufacturers, etc.) to easily obtain a specific amount of the material for a job or task and enables easier storage and materials control. A single reel of material is often used for multiple jobs. Many users manually track the usage of material from a reel while completing jobs. Some types of materials include a visual legend that is printed on the material at given intervals. Tracking the usage of material on reels is often necessary for inventory management, billing and project planning. Manually tracking the usage of material from a reel requires a significant amount of time and expense and necessitates a system for recording material use. In addition, manual tracking is subject to significant inaccuracies caused by human error. These inaccuracies contribute to waste and increase project cost.

A variety of material tracking systems have been previously developed for materials that are distributed from a reel. Some are generally of the type that attaches directly to the material, independent of the reel and tracks the movement of the line as it feeds from its container. Taymer International, Inc. (Markham, Ontario, CA) is one example of a distributor of measuring devices that are directly attached to the material being distributed. These devices are typically only used in the manufacture of cable because they use a system of complex rollers to measure the material as it is spooled out, which makes this solution expensive and prone to potential errors. This technical approach also requires recalibration of the devices for different material diameter.

Other material tracking systems are used in reel to reel audio tape monitoring, as exemplified in U.S. Pat. No. 5,808,824 to Kaniwa, et al. These systems combine reel to reel tape speed measurements with winding radius calculations to control tape feed through a complex series of measuring devices that are integrated with the machine that reads the tape. The system requires complex sensors on both reels along with calculations that feed back into the controlling device and require complex manufacturing and assembly. They are permanent components of the machinery and are not used to track inventory. In this system, the device uses a ratio between the tension of the tape and the torque output of the reel motors to calculate the radius of an empty take-up spool and then ultimately by tracking the tape fed calculations may be made to ultimately determine the radius of the working radius of the supply spool and the length of the fed tape.

Measurement of wire bonding loops is done in semiconductor fabrication as electronic wire is attached to various components as exemplified in U.S. Pat. No. 8,301,841 to Qin. These systems simply calibrate wire payout based on the timing of a payout mechanism and are not used to measure remaining length. They do not measure rotational variables from a spool, reel or other wire container.

U.S. Pat. No. 6,921,044 to Graber et al shows a device for storing and detecting the end of a wire as it is unspooled. The device uses the few wraps of wire closest to the drum to block the magnetic lines of flux from reaching the magnetic sensor mounted outside of the spool. As the last few wraps of wire no longer block the magnetic flux the sensor will momentarily pick up that flux once per rotation. If the sensor is hooked to an output source (e.g. Light, siren etc.) the output source will energize once per rotation informing the user that the wire is about to run out. Among other potential shortcomings, this device does not provide any advanced warning that the wire will be running out, let alone, provide any inventory management capabilities.

In the fishing gear industry, attempts have been made to develop sensor-based systems to track the amount of fishing line let out from a fishing reel. For example, U.S. Pat. No. 4,790,492 to Takashi provides for magnet-based sensor system for measuring and providing the length of fishing line played out or reeled in. This unitary system teaches one-to-one correspondence between sensor sub-system, processor, and display. As such, among other potential shortcomings, the approach disclosed by the '492 Takashi patent is too expensive for use in simultaneously tracking multiple reels of material.

SUMMARY OF THE INVENTION

In one aspect, the present disclosure relates to a system for tracking the remaining length of a material wound on a reel wherein the material has a known starting length and a known thickness and the reel has a core of known width and volume as well as two flanges physically connected to the reel at opposite ends of the reel core such that the reel flanges rotate with the reel core. The system comprises a detection element coupled proximate the outer edge of one of the reel flanges and two or more sensors physically deployed relative to the reel flange and each other such that each sensor independently produces a detection element present signal when the detection element is near the respective sensor in an order that is indicative of one of forward and reverse rotation of the reel. A first processor operably receives the detection element present signals from each of the sensors and counts a total number of forward rotations of the reel. A memory operably associated with the first processor stores the total number of forward rotations of the reel. In some instances, the memory may also be used to store a unique identification number. A first battery powering the first processor, memory, and each of the two or more sensors is also included in the system. These elements may all be associated with a single circuit board.

The system further includes a first transceiver operably coupled to the memory and a calculator operably coupled to the first transceiver that calculates the remaining length of the material wound on the reel based on the total number of forward rotations of the reel. The first transceiver may comprise a radio frequency transmitter in which case the system may include a second battery to power the first transceiver. Where the first transceiver is an RF transmitter the calculator would be operably coupled to the first transceiver via a wireless link.

The system may further include a global memory that is operably coupled to the first transceiver to store the unique identification number and the remaining length of the material wound on the reel associated with the unique identification number. In such instances, the system may be used to maintain an inventory of spools, such that an installer may select a previously used spool that has sufficient material for a particular job to minimize waste and maximize inventory utilization. The system may further include a clock coupled to the memory that outputs time values. In such instances, the memory may store over time a plurality of total number of forward rotations of the reel each with an associated time value. And in such systems, the global memory may further store a plurality of records associated with the unique identification number, each record containing a respective one of the plurality of total number of forward rotations of the reel and the associated time value. This data may allow a business to determine the time required to complete a particular job. Where the system further includes a GPS receiver, the memory may also store current geographic positions associated with each of the plurality of total number of forward rotations of the reel stored in the memory to allow further analysis of job site tasks.

In a second aspect, the disclosure further related to a method for continuously tracking the length of a material wound on a reel wherein the material has a known starting length and thickness and the reel has a core of known width and volume with two flanges physically connected to the reel at opposite ends of the reel core such that the reel flanges rotate with the reel core. The method comprises mounting a detection element proximate the outer edge of one of the reel flanges; operably associating the reel with a battery-powered sub-system that measures forward and backward rotation of the reel by sensing the detection element and stores associated rotation data; removably connecting a transceiver to the battery-powered system; and uploading the data stored in the battery-powered system via the transceiver to a calculator that calculates the remaining length of the material wound on the reel based on the total number of forward rotations of the reel.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. These other embodiments, and their features and advantages will become apparent to those skilled in the art from the following detailed description and the drawings.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. The term "set" is used broadly to refer to one or more. Also, electronic communications and notifications may be performed using other known means including direct connections, wireless connections, etc. The use of the term "reel" is used broadly and encompasses a cylinder, frame, or other device that turns on an axis and is used to wind up or pay out a material and can include a spool, a bobbin or a roller (which may collectively be referred to as a "core"). The term "material" herein includes a product of any length having a thickness (e.g. width-depth or diameter) that can be wound onto a spool and distributed by unwinding the reel. Examples of materials include, but are not limited to, bare metal wire, metal wire that contains a covering, flexible pipe, rope, yarn, thread, fabric, metal cable, coaxial cable, fiber optic cable, paper, tape, cellophane, plastic filament, 3D printing material and the like.

It should also be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention. Alternative configurations are possible.

Figure 1:
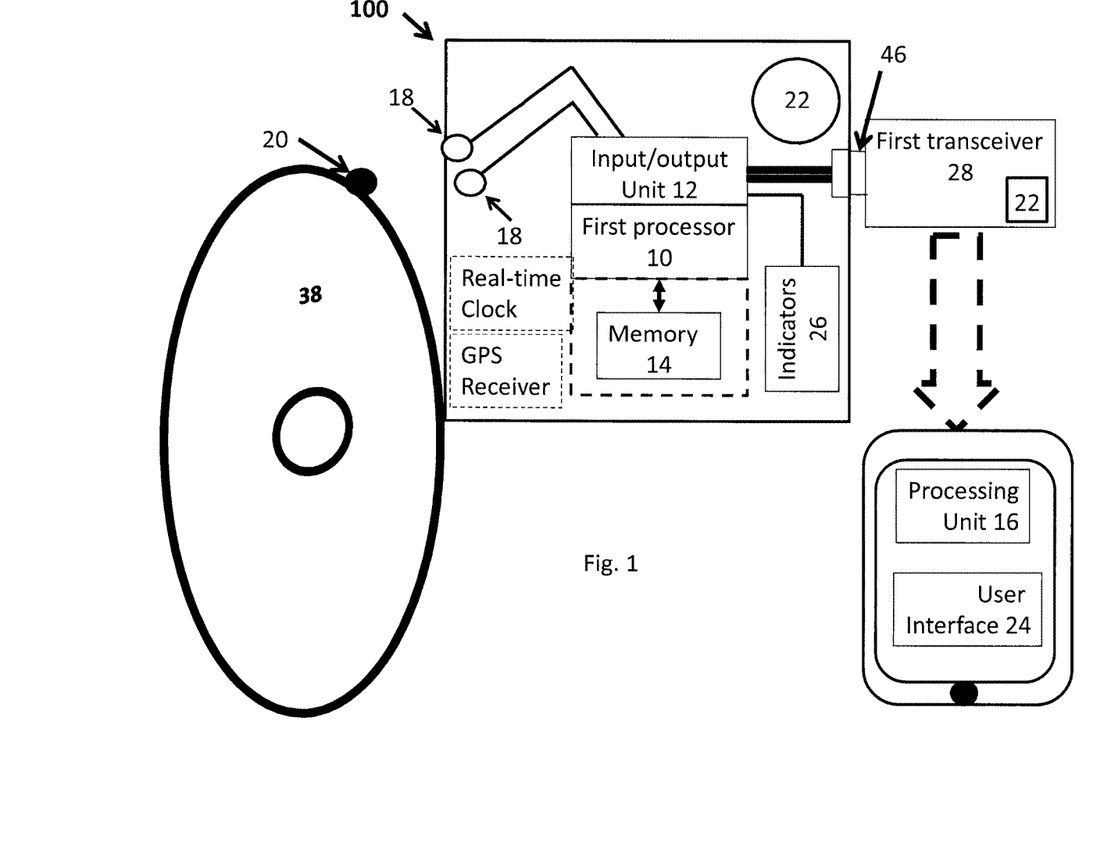
FIG. 1 is a block diagram of a material tracking system.

The invention described herein relates to tracking the usage of materials from a reel using a material tracking system. FIG. 1 demonstrates a basic configuration of the material tracking system. The system includes, among other components, a first processor 10 that may contain an input/output (I/O) unit 12, a memory 14 (which may be integral to the first processor 10), and a processing unit (CPU) 16; at least two sensors 18, a detection element 20, one or more power supply modules (e.g. a coin-type or LiPo battery cells) 22, one or more indicators 26, and one or more communications modules, including a first transceiver 28. The indicators 26 may, for example, comprise one of more LEDs and/or a liquid crystal display ("LCD"). In one implementation, the controller 10 is associated with a single printed circuit board ("PCB") that is populated with a plurality of electrical and electronic components that provide power, operational control, and protection to the material tracking system. The memory 14 may include, for example, a read-only memory ("ROM"), a random access memory ("RAM"), an electrically erasable programmable read-only memory ("EEPROM"), or other a flash memory. Memory 14 may store information regarding the rotation of the reel. For example, the memory 14 may contain the total number of forward rotations of the reel. In an embodiment including a real-time clock and/or a GPS receiver, the memory may also save time/date and/or GPS locations in association with the reel rotational data. Finally, the memory may also store an identification number that is unique to the reel/material to allow a business to track the material remaining on a plurality of reels simultaneously.

The controller or first processor 10 is operably connected via first transceiver 28 to an external device (e.g., a computer, a smart phone, a tablet), which includes a processing unit 16 and user interface 24 (i.e. combinations of software and hardware that are operable to, among other things, calculate the amount of material currently on a reel and activate the one or more indicators 26 or communicate with the one or more external devices). The processing unit 16 may be connected to a memory on the external device and executes software that is capable of being stored in the RAM (e.g., during execution), the ROM (e.g., on a generally permanent basis), or another non-transitory computer readable medium such as another memory or a disc.

Software included in some embodiments of the material tracking system is stored in the memory operably associated with the processing unit. The software includes, for example, firmware, one or more applications, program data, one or more program modules, and other executable instructions. The processing unit is configured to retrieve from memory and execute instructions related to the control processes and methods described below, including for example, the instructions for performing calculations necessary to determine the current amount of material on the reel 30 (see FIG. 2).

The PCB may also include, among other components, a plurality of additional passive and active components such as resistors, capacitors, inductors, integrated circuits, and amplifiers. These components are arranged and connected to provide a plurality of electrical functions to the PCB including, among other things, filtering, signal conditioning, or voltage regulation. For descriptive purposes, the PCB and the electrical components populated on the PCB are collectively referred to as the battery-powered measurement sub-system 100 (which may also be known as the counting chip). Furthermore, in some embodiments, the PCB includes means for affixing the sub-system 100 to a reel or a reel box. The means for affixing the system can be permanent or removable. In some embodiments, the PCB includes a cover or housing which is affixed to the PCB. The cover or housing can be permanent or, more preferably, removable. Where the reel or reel box is exposed to the elements, the housing can be waterproof or can contain a gasket or seal to prevent water, dust or other contaminants from reaching the PCB circuitry.

The user interface 24 is included to control the material tracking system. The user interface may operably coupled to the first processor 10 to receive or input, for example, physical parameters of a given reel 30 and/or the material stored on the reel for use in tracking usage of the material. Although shown as being associated with a smartphone that uses soft keys, the user interface 24 may include any combination of digital and analog input devices required to achieve a desired level of control for the system. For example, the user interface 24 can be comprised of a computer having a display and input devices, a touch-screen display, a plurality of knobs, dials, switches, buttons, faders, or the like.

The power supply module 22 supplies nominal voltages to the material tracking system. The power supply module 22 is comprised of one or more batteries or battery packs, and more preferably by one or more rechargeable batteries or battery packs. The power supply modules 22 are also configured to supply lower voltages to operate circuits and components within the material tracking system.

The communication module 28 sends and/or receives signals to and/or from one or more separate communication modules. Signals include, among other components, information, data, serial data, and data packets. The communication module 28 may be coupled to one or more separate communication modules via wires, fiber, and/or a wirelessly. Communication via wires and/or fiber can be any appropriate network topology known to those skilled in the art, such as Ethernet. Wireless communication can be any appropriate wireless network topology known to those skilled in the art, such as Wi-Fi, Bluetooth, Zig-Bee, etc.

In some embodiments, the communications module 28 is configured to receive an input. The input is, for example, a streaming input of data values, a data packet, a set of data, etc. The input includes, among other information, an input identifier (e.g., identification number) for a reel, a plurality of physical parameters for a reel (e.g., reel width, reel core volume, etc.), an input identifier (e.g., identification number) for a type of material, and a plurality of physical parameters for a type of material (e.g., material length, material outer diameter, etc.). After the input has been received, the input may be transmitted or transferred to the processing unit 16. In some embodiments, the processing unit is configured to retrieve, from the memory, a plurality of parameters for a type of material based at least in part on a received input identifier for a type of material. In other embodiments, the processing unit is configured to retrieve, from memory, a plurality of parameters for a reel based at least in part on a received input identifier for a reel.

Figure 2:
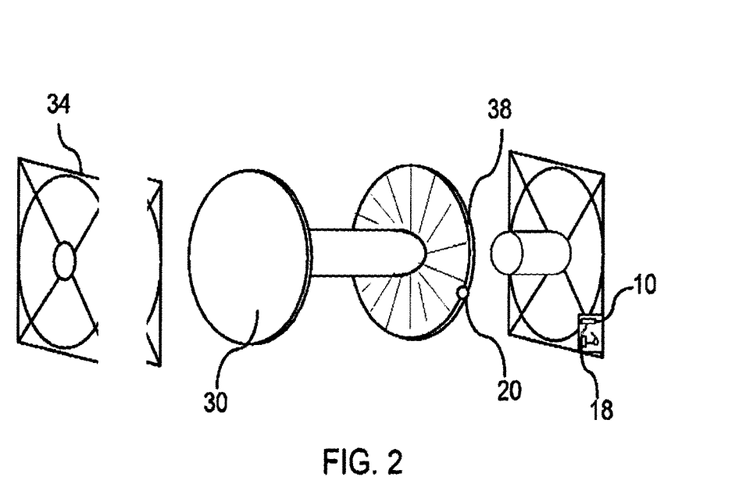
FIG. 2 is a schematic view of a reel in association with a battery-powered measurement sub-system that measures reel rotation and stores associated data.

Now turning to FIG. 2, which shows a common configuration of a reel 30. The end cap 34 can be removable or integrated permanently into the reel 30. The detection element 20 is coupled to the reel 30 and can be removable or permanently attached. In some embodiments, the detection element 20 is coupled to the outer edge of one of the flanges 38 of the reel 30. The battery-powered measurement sub-system 100 containing first processor 10 and sensors 18 are attached to the end cap 34 and is placed in such a position so as to track the rotation of the detection element 20.

Figure 3:
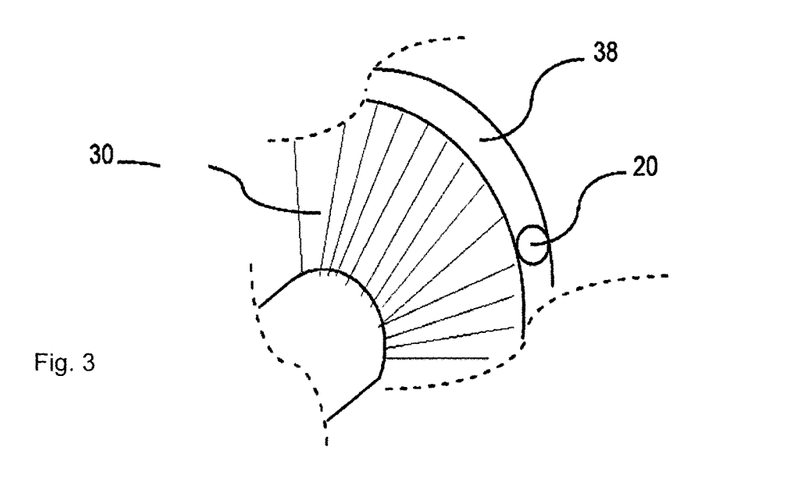
FIG. 3 is an enlarged schematic detail of a portion of a flange of a reel showing one embodiment of the placement of a detection element.

In FIG. 3, a close-up view of a flange 38 of a reel 30 is shown. A detection element 20 is shown attached to the outer edge of the flange 38.

When material is removed from or added to the reel, the reel rotates, which causes the detection element 20 to rotate.

The sensor 18 transmits a signal each time it detects the proximity of the detection element 20 (e.g., every time the detection element 20 passes the sensor 18). In some embodiments, the signals indicate the current direction of rotation of the reel (e.g. clockwise, counter-clockwise). In the preferred embodiment, sensors 18 are magnetic sensors. In alternate embodiments, sensor 18 may be a different type of sensor including, for example, a capacitive sensor, a laser sensor, an optical sensor, an infrared sensor, a touch sensor, etc. In some embodiments, the material tracking system includes a plurality of sensors that are spaced apart. Each sensor 18 in the plurality of sensors transmits a signal when the detection element passes. In the preferred embodiment, the detection element 20 is a type of magnet (e.g., neodymium). In alternate embodiments, the detection element 20 is any type of element appropriate for the specific type of sensor used in the system.

The first processor 10 is configured to receive signals from the sensor(s) 18. Upon receiving the signals, the controller 10 determines whether the reel 30 has rotated in a first direction (e.g., clockwise) or in a second direction (e.g., counter-clockwise). In some embodiments, the first processor/controller 10 receives a separate signal from each sensor 18 in a plurality of sensors and determines the rotation direction of the reel 30 based on the order in which the signals are received. For example, the controller 10 determines that the reel 30 is rotating in a first direction when a signal from a first sensor 18a is received before a signal from a second sensor 18b, and the controller determines that the reel 30 is rotating in a second direction when the signal from the second sensor 18b is received before the signal from the first sensor 18a.

The processing unit 16 may be configured to determine a new or updated value for the amount (e.g., length) of material on the reel 30. In some embodiments, the controller 10 determines the new amount of material on the reel 30 using the following equations:

$$x_{New} = x_{CURRENT} - 2\pi\sqrt{\frac{\left(\left(L*\pi*\left(\frac{d}{2}\right)^2 + n\right)/w\right)}{\pi}}.$$ Equation 1

$$x_{New} = x_{CURRENT} + 2\pi\sqrt{\frac{\left(\left(L*\pi*\left(\frac{d}{2}\right)^2 + n\right)/w\right)}{\pi}}.$$ Equation 2

Wherein:
L=starting length of the material on the reel in inches
d=diameter of the material on the reel in inches
n=volume of the core of the reel in cubic inches
w=width of the reel (i.e., distance between the flanges) in inches
$x_{CURRENT}$=the current value for the length of the material on the reel in inches, and
$x_{NEW}$=the new value for the length of the material on the reel in inches The processing unit 16 uses equation 1 when the reel 30 has rotated in the first direction (i.e., material has been removed from the reel 30). The processing unit 16 uses equation 2 when the reel 30 has rotated in the second direction (i.e., material has been added to the reel 30). Use of inches as the unit of measurement in Equations 1 and 2 are provided for exemplary purposes and any commonly used length unit (e.g. feet, yards, meters, centimeters, etc.) or any fraction thereof can be used. In some embodiments, the above-described parameters of the reel 30 and material are retrieved from the memory. In other embodiments, the above-described parameters of the reel 30 and material are received via the communication module 28.

After calculating a new or updated value for the amount of material on the reel 30, the processing unit transmits an output. The output is, for example, a streaming output of data values, a data packet, a set of data, etc. The output can include, among other things, an identifier (e.g., identification number) of the reel 30, an identifier (e.g., identification number) of the material, and/or the current value for the amount of material on the reel 30. This value can be in any commonly used linear measurement with inches being the preferred embodiment.

Figure 4A:
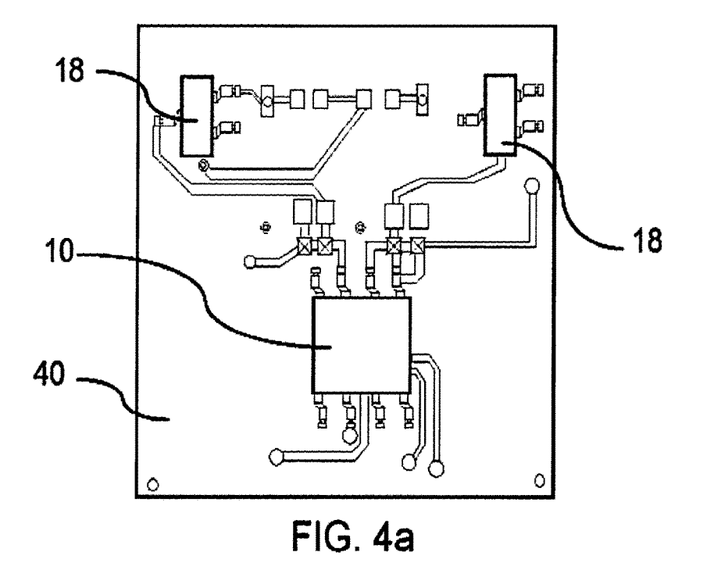
FIG. 4a is a schematic front view of one embodiment of a first side of a first PCB of the material tracking system, according to some embodiments of the invention.

FIG. 4a shows one embodiment of a first side 40 of a first PCB. In some embodiments, a first side 40 of the first PCB includes, among other components, a first controller 10 and a pair of sensors 18. In some embodiments, the first controller 10, among other operations, receives signals from the pair of sensors 18 as they track the detection element, transmits signals to a second controller of a second PCB, and performs the material tracking operations described above.

Figure 4B:
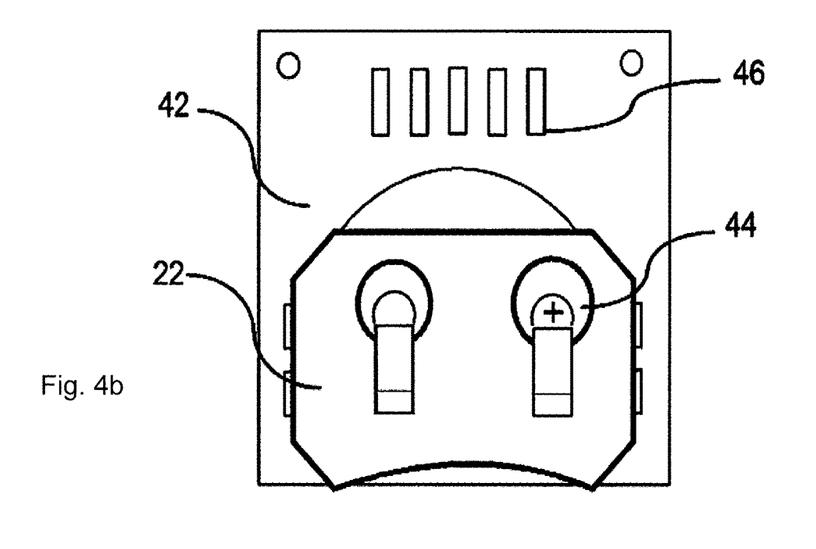
FIG. 4b is a schematic front view of one embodiment of a second side of the first PCB of the material tracking system, according to some embodiments of the invention.

In some embodiments, a second side 42 of the first PCB includes, among other components, a power supply module 22 containing a pair of batteries 44 and a connector 46, as illustrated in FIG. 4b. The connector 46 can be any type of standard connector for a PCB, including solid pads, pins or holes. In the preferred embodiment, solid pads are used as the connector 46. In some embodiments, the first PCB is coupled to a second PCB via the connector 46. In some embodiments, the first PCB is coupled to the end cap 34 during packaging of the material on the reel 30. In some embodiments, the first PCB is disposable.

Figure 5A:
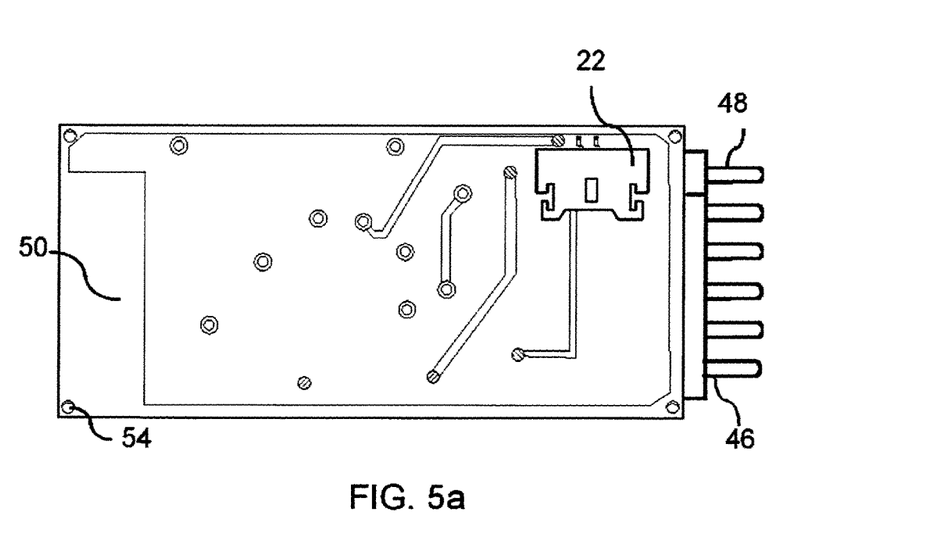
FIG. 5a is a schematic front view of an alternate embodiment of a first side of a first PCB of the material tracking system, according to some embodiments of the invention.

FIG. 5a shows one embodiment of a first side 50 of a second PCB. In some embodiments, a first side 50 of the second PCB includes, among other components, a power supply module 22 and a connector 46. In some embodiments, the power supply module 22 is a rechargeable battery and thus requires a dedicated power connection 48 included with the connector 46.

Figure 5B:
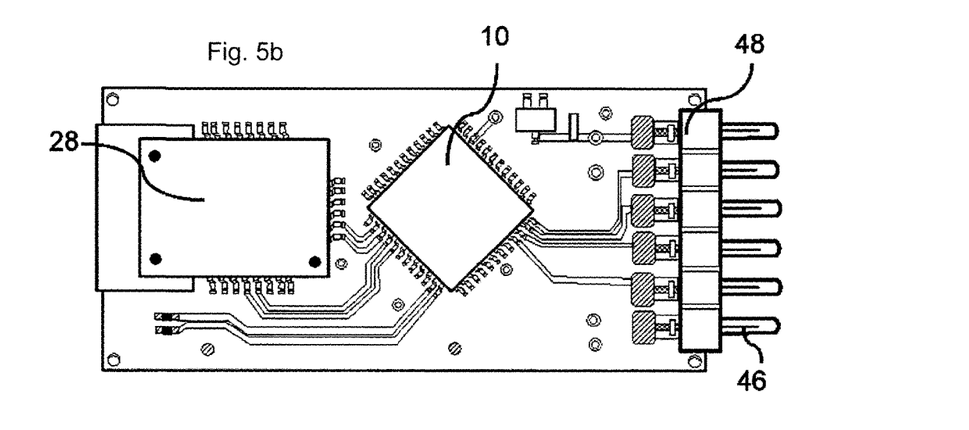
FIG. 5b is a schematic front view of an alternate embodiment of a second side of a first PCB of the material tracking system, according to some embodiments of the invention.

FIG. 5b shows a second side 60 of a second PCB. In some embodiments, the second side contains a second controller 10, a communication module 28 and a connector 46. The connector 46 can be any type of standard connector for a PCB, including solid pads, pins or holes. For exemplary purposes, pins are shown in FIGS. 5a and 5b. A dedicated power connection 48 for recharging the battery is included in the connector 46. In a preferred embodiment, the communication module 28 is a wireless transceiver (e.g. Bluetooth BTLE, Kirkland, Wash.). In some embodiments, the first PCB is coupled to a second PCB via the connector 46. In the preferred embodiment, the connector 46 of the second PCB links directly to the connector of the first PCB. In some embodiments, the connector 46 of the second PCB links to the first PCB via wires. In some embodiments, the first PCB is coupled to the end cap 34 during packaging of the material on the reel 30. In some embodiments, the second PCB (i.e. first transceiver 28) is removable and can be used on multiple first PCBs (i.e. battery-powered measurement subsystem 100). In some embodiments, the first PCB 100 may be disposable.

Figure 6A:
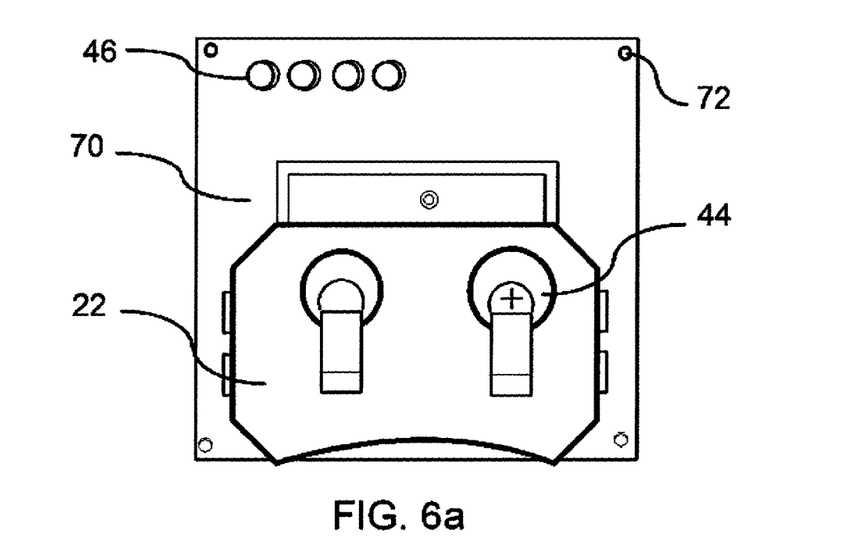
FIG. 6a is a schematic front view of one embodiment of a first side of a second PCB of the material tracking system, according to some embodiments of the invention.

FIG. 6a shows an alternate embodiment of a first side 70 of a first PCB. In some embodiments, a first side 70 of the first PCB includes, among other components, a power supply 22 and a connector 46. In some embodiments, the power supply module 22 is a pair of batteries 44. In this example, the connector 46 comprises a plurality of holes for pin connections. In one embodiment the PCB has a series of openings 72 to affix the PCB to an end cap. Standard affixing means such as screws, nails or the like can be used in the openings 72 to secure the PCB onto the end cap.

Figure 6B:
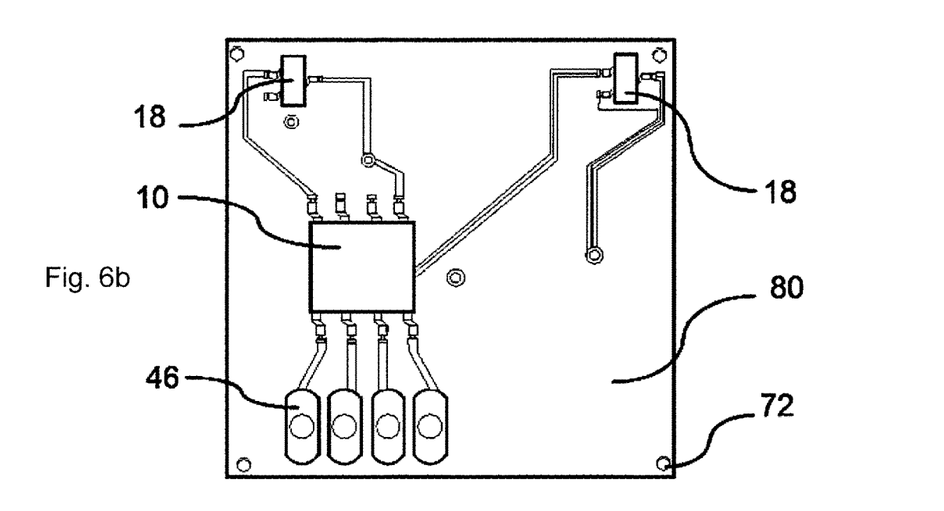
FIG. 6b is a schematic front view of one embodiment of a second side of a second PCB of the material tracking system, according to some embodiments of the invention

FIG. 6b shows an alternate embodiment of a second side 80 of a first PCB. In some embodiments, the second side 80 of the first PCB includes, among other components, a first controller 10, a pair of sensors 18 and a connector 46. The connector 46 can be any type of standard connector for a PCB, including solid pads, holes or pins. In this embodiment, the connector 46 comprises a plurality of holes, among other components. In one embodiment the PCB has a series of openings 72 to affix the PCB to an end cap. Standard affixing means such as screws or nails or the like can be used in the openings 72 to secure the PCB onto the end cap.

Figure 7A:
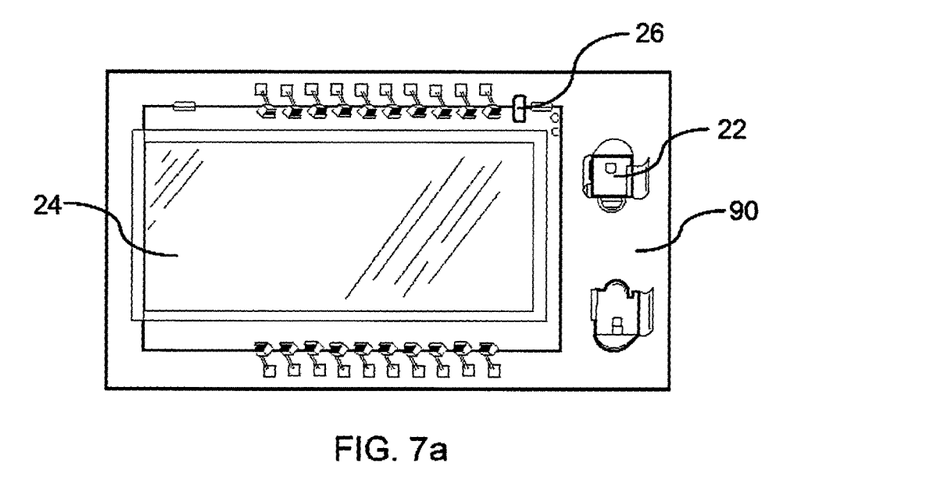
FIG. 7a is a schematic front view of an alternate embodiment of a first side of a second PCB of the material tracking system, according to some embodiments of the invention.

FIG. 7a shows an alternate embodiment of a first side 90 of a second PCB. This PCB may include, among other components, a user interface 24, an indicator 26, and a power supply module 22. In some embodiments, the user interface 24 is an LCD screen which displays a number that represents the current amount of material on the reel, in real time. In some embodiments, the user interface 24 displays information about the nature of the material and the reel that has been input by a user from a mobile computing platform such as a smart phone, tablet or computer. In some embodiments, the indicator 26 is an LED which activates or deactivates based on the amount of material on the reel. For example, the LED activates when less than 10% of the original amount of material is left on the reel. In some embodiments, the power supply module 22 holds a battery (not shown).

Figure 7B:
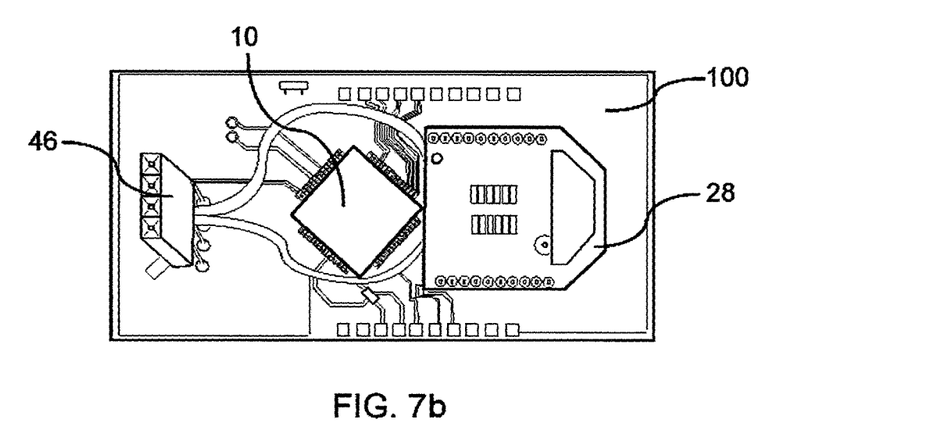
FIG. 7b is a schematic front view of an alternate embodiment of a second side of a second PCB of the material tracking system, according to some embodiments of the invention.

FIG. 7b shows an alternate embodiment of a second side 100 of the second PCB and includes, among other components, a second controller 10, a connector 46, and a communication module 28. In a preferred embodiment, the communication module 28 is wireless (e.g. Bluetooth, BTLE, Kirkland, Wash.). In some embodiments, the second PCB is coupled to a first PCB via the connector 46. In some embodiments, the second controller 10, among other operations, receives signals from the first controller of a first PCB, performs the material tracking operations described above, operates the user interface 24 and indicators 26, and transmits information to other components wirelessly via the communication module 28. In some embodiments, the second PCB is removably affixed to a reel box by a user after a reel is installed in the reel box. Means for affixing the second PCB can include any common means such as screws, nails, hook and loop connectors, wire, etc. In some embodiments, the second PCB is reusable and is used with multiple first PCBs.

Figure 8:
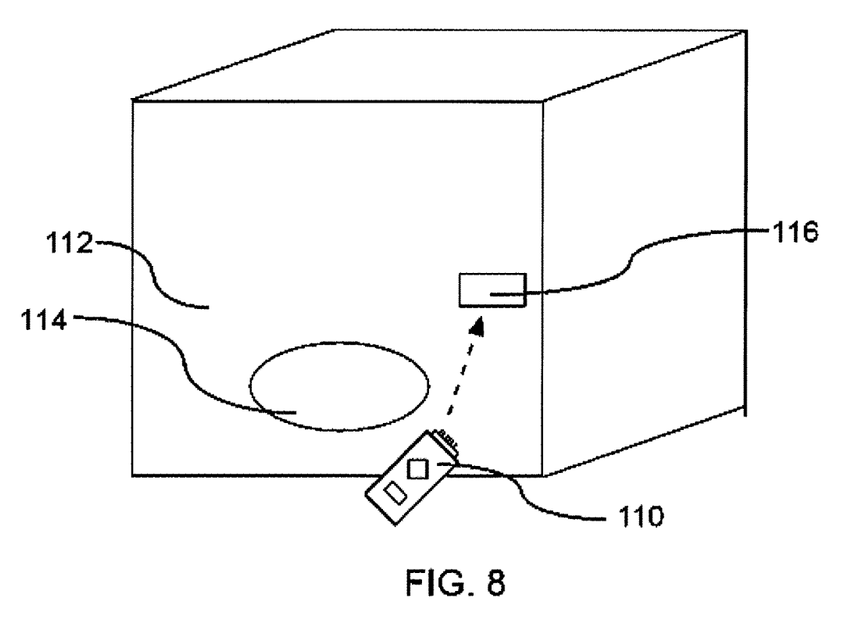
FIG. 8 is a diagram of a reel box containing the reel and battery-powered measurement sub-system of FIG. 2.

As illustrated in FIG. 8, in some embodiments, a second PCB 110 is coupled to a reel box 112 that contains, among other components, a reel (not shown). In some embodiments, the second PCB 110 is coupled to the reel or reel box 112 during packaging of the material on the reel. In a preferred embodiment, the second PCB is removable from the reel box 112 and is used with multiple first PCBs. In some embodiments, the second PCB is disposable. An opening 114 for the material to be removed from the reel box 110 is shown. A slot 116 for the removable second PCB to be connected to the first PCB (not shown) for up- and down-loading of information is shown. The slot 116 is oriented with the reel box 112 so that the connectors of the first PCB and second PCB 110 will align.

By way of example, first PCB containing magnetic sensors is affixed at a distance of 6 inches from the central axis of a first end cap that is sized for a reel of wire (Cat 5 Plenum, Anixter, Glenview, Ill.). The first and second end cap are placed on the reel. A magnetic detection element (#8 Screw Neodymium magnet, Applied Magnets, Plano, Tex.) is attached to a flange of the reel opposite from the first end cap. The reel is placed in a reel box and shipped to a user. The user may program a second PCB with the input identifier by a laptop computer which sends the information wirelessly to the transceiver in the second PCB. The user then attaches the second PCB to the outside of the reel box. As the user retrieves wire from the reel box, the reel rotates and the sensors of the first PCB detect the rotation of the detection element. The sensors send a signal to the second PCB with the number of rotations which can be a whole number or a fractional number. The sensor also detects, tracks and transmits reverse rotations as wire is replaced or unused wire is rewound. The second PCB may be loaded with software which performs the calculations as described above using either Equation 1 for forward rotation (use of wire) or Equation 2 for reverse rotation (respooling or reloading). The second PCB may then send a signal containing the current amount of wire to the laptop computer for material tracking purposes.

In an alternate example, a first PCB containing optical sensors is affixed at a distance of 1 foot from the central axis of a first end cap that is sized for a reel of wire (18-02 OAS, Lake Cable 529 Thomas Drive Bensenville, Ill.). The first and second end cap are placed on the reel. An optical detection element (Light to digital converter, AMS, Styria Austria is placed on a flange of the reel opposite from the first end cap. This is repeated for multiple reels of wire. The reels are shipped to a user. The user programs a second PCB with the input identifier of each reel with a smart phone. The smart phone sends the information to a wireless transceiver in the first PCB. As the user retrieves wire from the reel box, the reel rotates and the sensors of the first PCB detect the rotation of the detection element. The sensors send a signal to the smart phone with the input identifier and the number of rotations which can be a whole number or a fractional number. The sensor also detects, tracks, and transmits reverse rotations as wire is replaced or unused wire is rewound.

In a preferred embodiment, the processing unit 16 on a smart phone (or other portable computing device) is loaded with an application which performs the calculations as described above using either Equation 1 for forward rotation (use of wire) or Equation 2 for reverse rotation (respooling or reloading). The smart phone application may further provide a spreadsheet on the smart phone screen containing the current amount of wire for each reel by using the unique identification number stored in the memory associated with each reel. This information is then uploaded at a preferred interval (e.g. hourly, daily, weekly, monthly) to software on a desktop computer in the user's inventory control office.

The basic information regarding the amount of material, time/date, and GPS location obtained from the battery-powered measurement sub-system 100 may be manipulated by the processing unit 16 to determine a variety of potentially useful management metrics. For example, the data may easily be mathematically and logically organized and reorganized to determine: (a) the date and time of each pull; (b) location of each pull; (c) accurate billing based on time and materials actually expended at a specific job; (d) reducing overhead and minimizing wasted materials; and (e) maximize installer efficiency.

In particular, the system allows an installer, his supervisor, supply ordering clerks to see the length wire remaining in each box on site and at the office. For an installer on-site, the information means no more wasted labor time guessing whether a spool will make it to the end of the run; or risking a time exhausting repull. On the other hand, a supervisor would be able to see how many feet of cable have been installed versus the amount of cable use projected for a given job.

Scrapping cable is leakage that most of us just deal with right now because of the labor cost to sort it out. This is the tool which seamlessly provides us with actionable inventory data allows users to use all their cable efficiently. In view of the functionality of the present system, the remaining inventory after a job is complete may be put into 'My Random Lengths Inventory' these random lengths will be easily searchable for use at future job sites.

Historic data on how much cable was pulled at which location on which day may be used to assist in spotting trends related to issues with job types or indicate which installers are most efficient.

What is claimed is:

1. A system for tracking the remaining length of a material wound on a reel, the material having a known starting length and a known thickness, the reel having a core of known width and known volume, the reel further having two flanges physically connected to the reel at opposite ends of the reel core such that the reel flanges rotate with the reel core, the material being wound about the reel core between the two reel flanges, each reel flange having an outer edge, the system comprising:
   a detection element coupled proximate the outer edge of one of the reel flanges;
   two or more sensors comprising a first sensor and a second sensor physically deployed relative to the reel flange and each other such that at least the first sensor produces a detection element present signal when the detection element is near the first sensor and the second sensor independently produces the detection element present signal when the detection element is near the second sensor of the two or more sensors in an order that is indicative of one of forward and reverse rotation of the reel, wherein the detection element passes by each of the two or more sensors;
   a first processor operably receiving the detection element present signals from each of the sensors and counting a total number of forward rotations of the reel;
   a memory operably associated with the first processor for storing the total number of forward rotations of the reel;
   a first battery powering the processor, the memory, and each of the two or more sensors;
   a first transceiver operably coupled to the memory; and
   a calculator operably coupled to the first transceiver that calculates the remaining length of the material wound on the reel based on the total number of forward rotations of the reel.

2. The system of claim 1 wherein the first transceiver comprises a radio frequency transmitter and a second battery powering the first transceiver, the calculator being operably coupled to the first transceiver via a wireless link.

3. The system of claim 2 wherein a unique identification number is associated with the reel to be stored in the memory, the system further comprising a global memory operably coupled to the first transceiver for storing the unique identification number and the remaining length of the material wound on the reel associated with the unique identification number; wherein the unique identification number identifies a specific reel of a plurality of reels to maintain an inventory of the plurality of reels.

4. The system of claim 3 further comprising a clock coupled to the memory that outputs time values, the memory storing over time a plurality of total number of forward rotations of the reel each with an associated time value.

5. The system of claim 4 further comprising a global memory, wherein the global memory further stores a plurality of records associated with the unique identification number, each record containing a respective one of the plurality of total number of forward rotations of the reel and the associated time value.

6. The system of claim 5 further comprising a GPS receiver that outputs a current geographic position, the memory further storing the current geographic position associated with each of the plurality of total number of forward rotations of the reel stored in the memory.

7. The system of claim 6 wherein each record in the plurality of records associated with the unique identification number further contains the geographic position associated with the respective one of the plurality of total number of forward rotations of the reel.

8. The system of claim 6 wherein the sensors, first processor, clock, GPS receiver, and memory are disposed in association with a single circuit board.

9. The system of claim 3 further comprising a GPS receiver that outputs a current geographic position, the memory storing a plurality of total number of forward rotations of the reel each with an associated geographic position.

10. The system of claim 9 further comprising a global memory, wherein the global memory further stores a plurality of records associated with the unique identification number, each of records containing a respective one of the plurality of total number of forward rotations of the reel and the associated geographic position.

11. The system of claim 1 wherein the detection element is a magnet and the sensors read magnetic flux.

12. The system of claim 1 wherein the detection element is an optical marker and the sensors are optical.

13. The system of claim 1 wherein the sensors, first processor, and memory are disposed in association with a single circuit board.

* * * * *